US012711077B2

(12) United States Patent
Natarajan

(10) Patent No.: US 12,711,077 B2
(45) **Date of Patent: *Aug. 18, 2026**

(54) FIRMWARE MANAGEMENT OF LEAST RECENTLY USED MEMORY FOR CACHE HINT OPTIMIZATION

(71) Applicant: SK Hynix NAND Product Solutions Corp., Rancho Cordova, CA (US)

(72) Inventor: Sriram Natarajan, Folsom, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 18/902,604

(22) Filed: Sep. 30, 2024

(65) Prior Publication Data

US 2025/0021489 A1 Jan. 16, 2025

Related U.S. Application Data

(63) Continuation of application No. 18/207,570, filed on Jun. 8, 2023, now Pat. No. 12,141,077.

(51) Int. Cl.
*G06F 12/12* (2016.01)
*G06F 12/02* (2006.01)
(Continued)

(52) U.S. Cl.
CPC ........ *G06F 12/123* (2013.01); *G06F 12/0246* (2013.01); *G06F 13/1668* (2013.01)

(58) Field of Classification Search
CPC . G06F 12/123; G06F 12/0246; G06F 13/1668
See application file for complete search history.

(56) References Cited

U.S. PATENT DOCUMENTS 11,243,700 B2 2/2022 Lee et al.
2011/0022778 A1* 1/2011 Schibilla ............ G06F 12/0246 711/170

(Continued)

FOREIGN PATENT DOCUMENTS

JP 2011186555 A 9/2011

OTHER PUBLICATIONS

SK Hynix NAND Product Solutions Corp. (dba Solidigm), PCT/US2024/032626, International Search Report and Written Opinion, dated Sep. 19, 2024, 10 pgs.

(Continued)

*Primary Examiner* — Masud K Khan
(74) *Attorney, Agent, or Firm* — Morgan, Lewis & Bockius LLP

(57) ABSTRACT

This application is directed to memory management in an electronic device. A memory includes a plurality of superblocks and receives a plurality of access requests. The electronic device stores information of an ordered list of superblocks in a cache, and each of a first subset of superblocks has a hint value and is ordered based on the hint value. In response to the plurality of access requests, the electronic device accumulates respective hint values of the first subset of superblocks and dynamically determines positions of the first subset of superblocks in the ordered list of superblocks based on the respective hint values of the first subset of superblocks. The ordered list of superblocks is pruned to generate a pruned list of superblocks. Based on the pruned list of superblocks, the electronic device converts a second subset of superblocks from a first memory type to a second memory type.

20 Claims, 11 Drawing Sheets

(51) Int. Cl.
*G06F 12/123* (2016.01)
*G06F 13/16* (2006.01)

(56) References Cited

U.S. PATENT DOCUMENTS

| | | | | |
|---|---|---|---|---|
| 2015/0363105 | A1 | 12/2015 | Nakao et al. | |
| 2017/0091107 | A1* | 3/2017 | Peterson | G06F 12/084 |
| 2017/0286288 | A1* | 10/2017 | Higgins | G06F 12/0246 |
| 2018/0357160 | A1* | 12/2018 | Gorobets | G06F 3/064 |
| 2021/0004323 | A1 | 1/2021 | Kang | |
| 2023/0289078 | A1* | 9/2023 | Wells | G06F 3/0604 |

OTHER PUBLICATIONS

Zhiyong Zhang et al., "UniBuffer: Optimizing Journaling Overhead with Unified DRAM and NVM Hybrid Buffer Cache", In: IEEE Transactions on Computer-Aided Design of Integrated Circuits and Systems, vol. 39, No. 9, Sep. 2020, Date of Publication: Jun. 27, 2019, 14 pgs.
Sriram Natarajan, U.S. Appl. No. 18/207,570, Notice of Allowance, Jul. 10, 2024, 10 pgs.

* cited by examiner

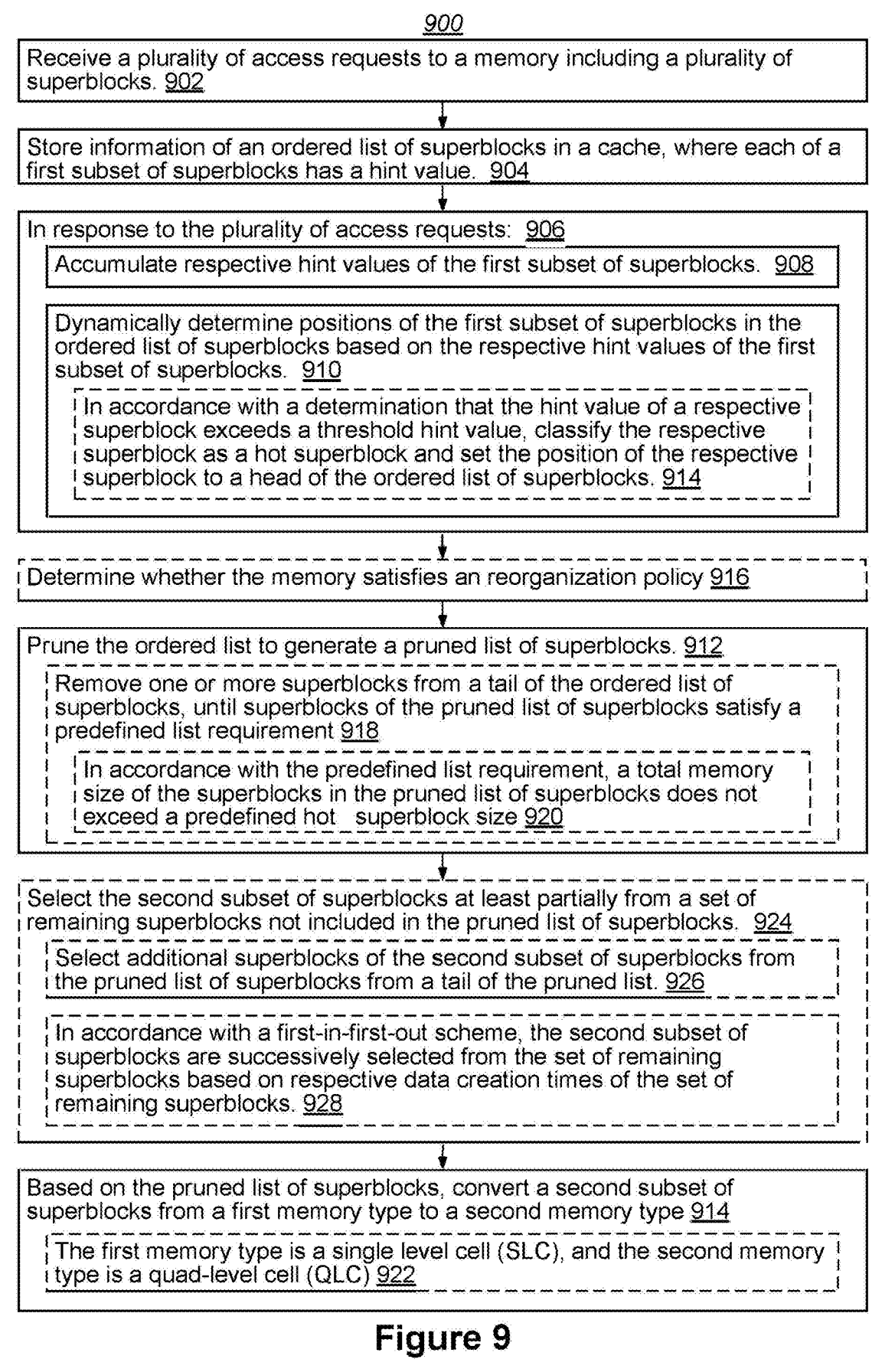

900

Receive a plurality of access requests to a memory including a plurality of superblocks. 902

Store information of an ordered list of superblocks in a cache, where each of a first subset of superblocks has a hint value. 904

In response to the plurality of access requests: 906

Accumulate respective hint values of the first subset of superblocks. 908

Dynamically determine positions of the first subset of superblocks in the ordered list of superblocks based on the respective hint values of the first subset of superblocks. 910

In accordance with a determination that the hint value of a respective superblock exceeds a threshold hint value, classify the respective superblock as a hot superblock and set the position of the respective superblock to a head of the ordered list of superblocks. 914

Determine whether the memory satisfies an reorganization policy 916

Prune the ordered list to generate a pruned list of superblocks. 912

Remove one or more superblocks from a tail of the ordered list of superblocks, until superblocks of the pruned list of superblocks satisfy a predefined list requirement 918

In accordance with the predefined list requirement, a total memory size of the superblocks in the pruned list of superblocks does not exceed a predefined hot superblock size 920

Select the second subset of superblocks at least partially from a set of remaining superblocks not included in the pruned list of superblocks. 924

Select additional superblocks of the second subset of superblocks from the pruned list of superblocks from a tail of the pruned list. 926

In accordance with a first-in-first-out scheme, the second subset of superblocks are successively selected from the set of remaining superblocks based on respective data creation times of the set of remaining superblocks. 928

Based on the pruned list of superblocks, convert a second subset of superblocks from a first memory type to a second memory type 914

The first memory type is a single level cell (SLC), and the second memory type is a quad-level cell (QLC) 922

Figure 9

FIRMWARE MANAGEMENT OF LEAST RECENTLY USED MEMORY FOR CACHE HINT OPTIMIZATION

RELATED APPLICATION

This application is a continuation of, and claims benefit of, U.S. patent application Ser. No. 18/207,570, filed Jun. 8, 2023, titled "Firmware Management of Least Recently Used Memory for Cache Hint Optimization," which is incorporated by reference in its entirety.

TECHNICAL FIELD

This application relates to memory management including, but not limited to, methods, systems, devices, and non-transitory computer-readable media for managing memory units of a memory system (e.g., a solid state drive) and enhancing memory operation efficiency on a firmware level.

BACKGROUND

Memory is applied in a computer system to store instructions and data, and the data are processed by one or more processors according to the instructions stored in the memory. Particularly, the one or more processors are coupled to non-volatile memory (e.g., hard disk drives (HDDs) or solid-state drives (SSDs)) to store the instruction and data even if the computer system is decoupled from a power source. The non-volatile memory includes a host managed cache (HMC), which relies on hints sent by a host driver to select the coldest blocks for garbage collection. Firmware aggregates the hints to access a certain memory block of the non-volatile memory until the aggregated hints reach a threshold level to cause the memory block to be classified as "hot" or "important." However, many computer systems do not offer a handshaking mechanism to demote the "hot" memory block to "cold." The memory block storing data that was accessed frequently at some point of time would continue to be treated as "hot," even though it has not been accessed for an extended duration of time and could have been demoted to "cold" by the host driver. This type of memory blocks can easily use up limited logical block addresses (e.g., around 20 GB), which is supposed to be reserved for important and frequently accessed data (also called "hot" data). In the absence of the handshaking mechanism to demote a memory block that is no longer accessed frequently, the limited memory space reserved for the important data can be released and cleared to save new important data. It would be beneficial to manage memory units (specifically, least recently used (LRU) memory units) in a memory system effectively and efficiently to store important data that needs to be frequently accessed.

SUMMARY

Various embodiments of this application are directed to methods, systems, devices, non-transitory computer-readable media for monitoring activities of individual memory blocks in real time based on incoming access requests and managing different types of memory blocks accordingly in a memory system (e.g., NAND SSDs). A host driver sends hints to a host managed cache (HMC) to access different memory units (e.g., superblocks) in the memory system. A hint value is tracked for each individual superblock and aggregated to determine whether the respective superblock is currently "hot" (e.g., frequently and recently accessed). A plurality of superblocks of the memory system is dynamically ranked in an ordered list of superblocks based on respective hint values. In some embodiments, the memory system stores a finite amount of data that is classified as "hot," and firmware defines a constant maxLRUSize (e.g., in a unit of 4 KB) to limit the amount of "hot" data accordingly. The ordered list of superblocks is pruned to generate a pruned list of superblocks, e.g., based on the constant maxLRUSize. Superblocks on the pruned list of superblocks are kept as or converted to a first memory type (e.g., single layer cell (SLC) memory). Further, in some embodiments, superblocks that is external to the pruned list of superblocks are kept as or converted to a second memory type (e.g., quadra-layer cell (QLC) memory) that has a higher memory density, but a slower access rate, than the first memory type. By these means, the limited amount of memory space having the first memory type is dynamically re-allocated to store "hot" data that needs to be frequently accessed, particularly when the memory space of the priority memory type has already been used up or is almost used up.

In one aspect, a method is implemented at an electronic device to manage a memory system including a plurality of superblocks. The method includes receiving a plurality of access requests to the memory system and storing information of an ordered list of superblocks in a cache. Each of a first subset of superblocks has a hint value and is ordered based on the hint value. The method further includes, in response to the plurality of access requests, accumulating respective hint values of the first subset of superblocks and dynamically determining positions of the first subset of superblocks in the ordered list of superblocks based on the respective hint values of the first subset of superblocks. The method further includes pruning the ordered list of superblocks to generate a pruned list of superblocks and converting a second subset of superblocks from a first memory type to a second memory type based on the pruned list of superblocks.

In some embodiments, dynamically determining positions of the first subset of superblocks in the ordered list of superblocks further includes, dynamically and in response to each respective access request, in accordance with a determination that the hint value of a respective superblock exceeds a threshold hint value $HV_T$, classifying the respective superblock as a hot superblock and setting the position of the respective superblock to a head of the ordered list of superblocks.

In some embodiments, pruning the ordered list of superblocks further includes removing one or more superblocks from a tail of the ordered list of superblocks, until superblocks of the pruned list of superblocks satisfy a predefined list requirement. Further, in some embodiments, in accordance with the predefined list requirement, a total memory size of the superblocks in the pruned list of superblocks does not exceed a predefined hot superblock size.

In some embodiments, the method further includes determining whether the memory satisfies an reorganization policy (e.g., requiring that a first portion of the memory system having the first memory type be fully occupied or occupied by a predefined portion (e.g., 80%)). In accordance with a determination that the memory satisfies the reorganization policy, the ordered list of superblocks is pruned and the second subset of superblocks is converted.

In another aspect, some implementations include an electronic device that includes one or more processors and memory having instructions stored thereon, which when executed by the one or more processors cause the processors to perform any of the above methods.

In yet another aspect, some implementations include a non-transitory computer readable storage medium storing one or more programs. The one or more programs include instructions, which when executed by one or more processors cause the processors to implement any of the above methods.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 9 is a flow diagram of another example memory management method implemented by an electronic device, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
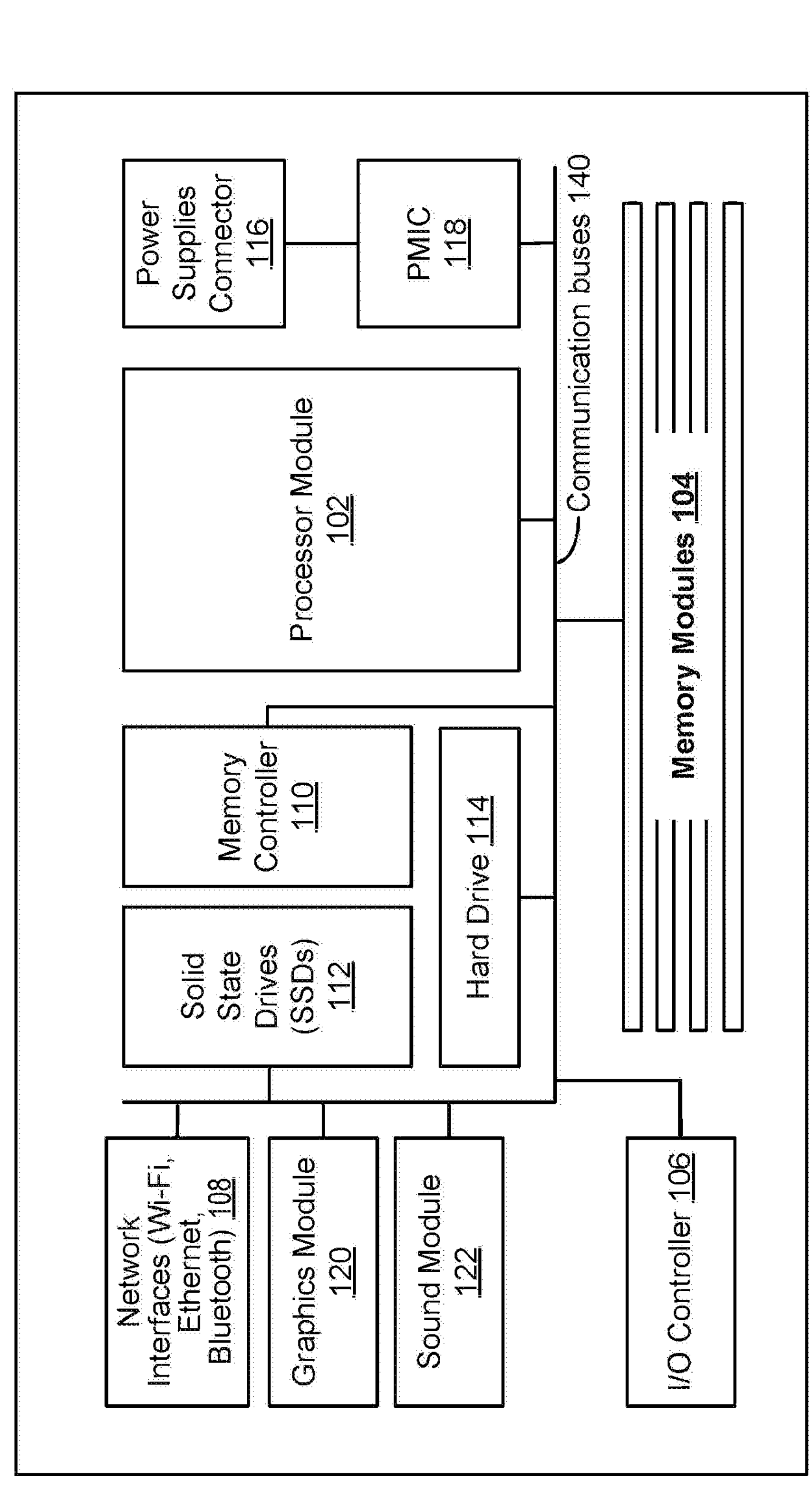
FIG. 1 is a block diagram of an example system module in a typical electronic device, in accordance with some embodiments.

FIG. 1 is a block diagram of an example system module 100 in a typical electronic device in accordance with some embodiments. The system module 100 in this electronic device includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic device to exchange data with an external source, e.g., a server or another electronic device. In some embodiments, the communication buses 150 include circuitry (sometimes called a chipset) that interconnects and controls communications among various system components included in system module 100.

In some embodiments, the memory modules 104 include high-speed random access memory, such as dynamic random access memory (DRAM), static random-access memory (SRAM), double data rate (DDR) random access memory (RAM), or other random access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, solid state drives (SSDs) 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic device. The SSDs 112 are configured to apply integrated circuit assemblies to store data in the electronic device, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic device. The graphics module 120 is configured to generate a feed of output images to one or more display devices according to their desirable image/video formats. The sound module 122 is configured to facilitate the input and output of audio signals to and from the electronic device under control of computer programs.

It is noted that communication buses 150 also interconnect and control communications among various system components including components 110-122.

Further, one skilled in the art knows that other non-transitory computer readable storage media can be used, as new data storage technologies are developed for storing information in the non-transitory computer readable storage media in the memory modules 104, SSDs 112, and/or, hard drive 114. These new non-transitory computer readable storage media include, but are not limited to, those manufactured from biological materials, nanowires, carbon nanotubes and individual molecules, even though the respective data storage technologies are currently under development and yet to be commercialized.

Some implementations of this application are directed to managing data protection and validation effectively and efficiently to reduce associated overprovisioning space and dummy data operations in a memory system (e.g., SSDs 112, memory module 104) of the system module 100. User data and associated integrity data are stored in two distinct memory blocks of the memory system. After the user data and integrity data are stored, the user data is read back, and validity of the user data is checked with respect to the integrity data. In accordance with a validation of the user data, the corresponding integrity data is invalidated and discarded from the memory system. Conversely, in accordance with an invalidation of the user data, the user data is corrected based on the integrity data, and the corresponding integrity data is subsequently invalidated and discarded from the memory system. By these means, the memory system validates the user data prior to receiving any read request for the user data, and discards the integrity data after the user data is validated or corrected. The system module 100 does not need to reserve large amount of dedicated memory space for storing the integrity data in the SSD 112 or memory modules 104, nor does it need to implement additional data migration operations on the integrity data when the user data needs to be migrated (e.g., in an internal copyback).

Figure 2:
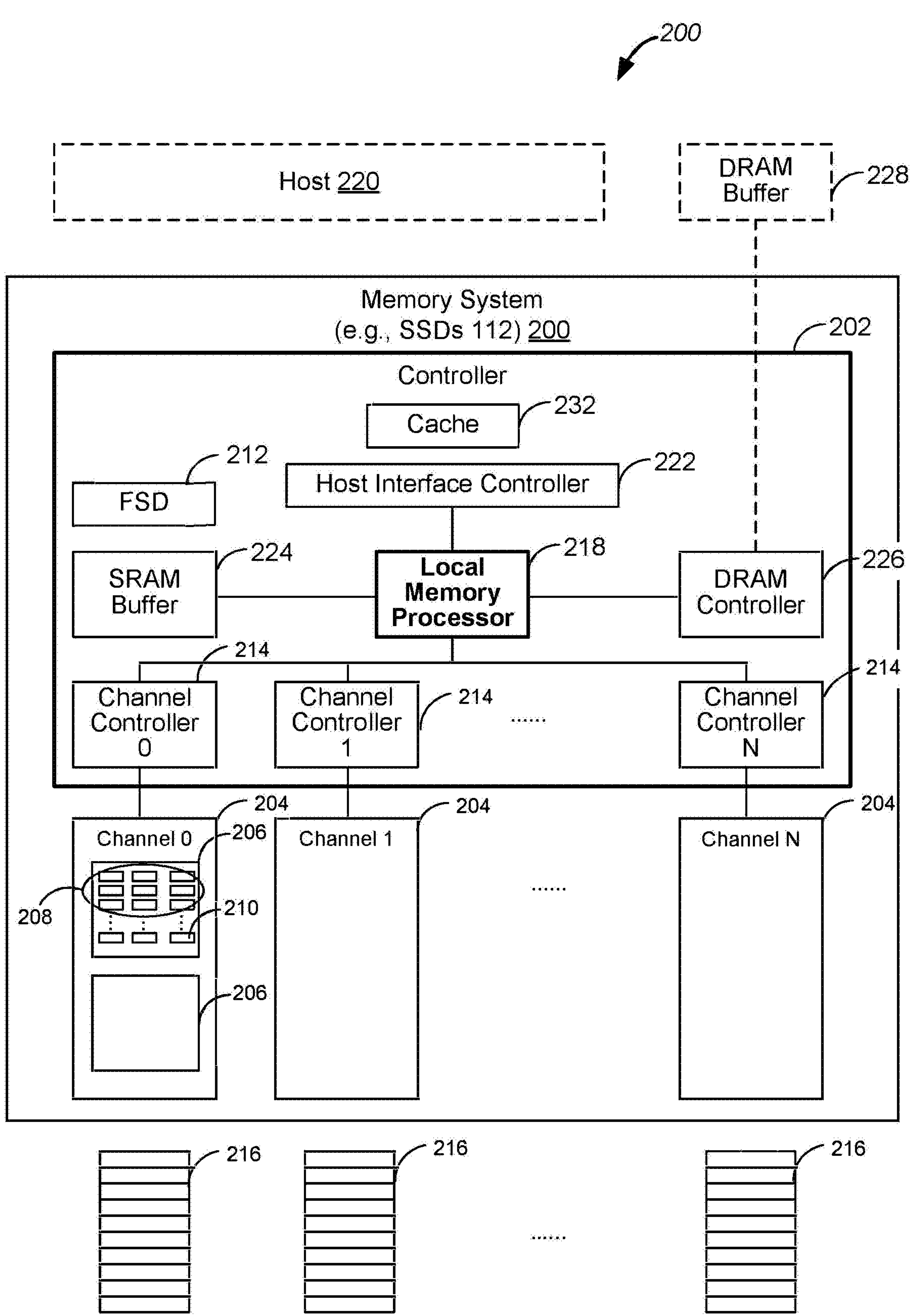
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204. Each memory channels 204 includes a plurality of memory cells. The controller 202 is configured to executes firmware level software to bridge the plurality of memory channels 204 to the host device 220. Specifically, the controller 202 is configured to communicate with the host device 220, manage a file system directory (FSD) 212 for tracking data locations in the memory channels 204, organize the plurality of memory channels 204, and facilitate internal and external requests to access the memory channels 204.

Each memory channels 204 includes on one or more memory packages 206 (also called flash chips). In an example, each memory package 206 includes eight memory dies. In another example, each memory package 206 corresponds to a memory die. Each memory package 206 includes a plurality of memory planes 208, and each memory plane 208 further includes a plurality of memory pages 210 that is optionally organized in memory blocks (not shown in FIG. 2). Each memory page 210 includes an ordered set of memory cells, and each memory cell is identified by a respective physical address. In some embodiments, the memory system 200 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory chips 204. In an example, each superblock includes at least one set of memory pages, where each page is distributed on a distinct one of the plurality of memory chips 210, has the same die, plane, block, and page designations, and is accessed via a distinct channel of the distinct memory chip 204. In another example, each superblock includes at least one set of memory blocks, where each memory block is distributed on a distinct one of the plurality of memory chips 210, includes a plurality of pages, has the same die, plane, and block designations, and is accessed via a distinct channel of the distinct memory chip 204. The memory system 200 stores (operation 904) information of an ordered list of superblocks in a cache 232. In some embodiments, the cache 232 is managed by a host driver of the host device 220, and called a host managed cache (HMC).

In some embodiments, the memory system 200 includes a single layer cell (SLC) memory system, and each memory cell stores a single data bit. In some embodiments, the memory system 200 includes an MLC memory system, and each memory cell stores a plurality of data bits. In an example, each memory cell of a multi-level cell (MLC) memory system stores 2 data bits. In another example, each memory cell of a triple-level cell (TLC) memory system stores 3 data bits. In another example, each memory cell of a quad-level cell (QLC) memory system stores 4 data bits. In yet another example, each memory cell of a penta-level cell (PLC) memory system stores 5 data bits. In some embodiments, each memory cell can store any suitable number of data bits by a six- or higher-level memory cell. Compared with the MLC, TLC, QLC, or PLC memory system, the SLC memory system operates with a higher speed, a higher reliability, and a longer lifespan, and however, has a lower device density and a higher price. In some embodiments, each of the SLC, MLC, TLC, QLC, PLC, or six- or higher-level cell memory system includes one or more SSDs.

Each memory channel 204 is coupled to a respective channel controller 214 configured to control internal and external requests to access memory cells in the respective memory channel 204. In some embodiments, each memory package 206 (e.g., each memory die) corresponds to a respective queue 216 of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 correspond to a distinct queue 216 of memory access requests. In some embodiments, all of the plurality of memory channels 204 of the memory system 200 correspond to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204.

In some embodiments, in addition to the FSD 212 and channel controllers 214, the controller 202 further includes a local memory processor 218, a host interface controller 222, an SRAM buffer 224, and a home memory buffer (HMB) controller 226. The local memory processor 218 accesses the plurality of memory channels 204 based on the one or more queues 216 of memory access requests. In some embodiments, the local memory processor 218 writes into and read from the plurality of memory channels 204 on a memory chunk basis. Data of one or more memory chunks is written into, or read from, the plurality of channels jointly. No data in the same memory chunk is written via more than one operation. Each memory chunk optionally corresponds to one or more memory pages 210. In an example, each memory chunk to be written or read jointly in the plurality of memory channels 204 has a size of 16 KB (e.g., one memory page 210). In another example, each memory chunk to be written or read jointly in the plurality of memory channels 204 has a size of 64 KB (e.g., four memory pages 210). In some embodiments, each memory page 210 has 16 KB user data and 2 KB metadata. Additionally, a number of memory chunks to be accessed jointly and a size of each memory chunk are configurable for each of the system read, host read, system write, and host write operations. Stated another way, the number of memory chunks to be accessed jointly and the size of each memory chunk are not limited by the examples shown in this application, and can have different sizes that are not detailed in this application.

In some embodiments, the local memory processor 218 temporarily stores data to be written into, or data read from, the memory channels 204 in an SRAM buffer 224 of the controller 202. Alternatively, in some embodiments, the local memory processor 218 is coupled to the HMB controller 226, and temporarily stores the data to be written into, or the data read from, the memory channels 204 in a host memory buffer (HMB) 228 via the HMB controller 226 or host interface controller 222. The HMB 228 is external to the controller 202, and is main memory used by the processor module 102 (FIG. 1). In some embodiments, the HMB 228 is one of SRAM, DRAM, 3D XPOINT, and magnetoresistive RAM (MRAM), or other RAM devices. Further, in some embodiments, the memory system 200 includes an SSD coupled to a DRAM based HMB 228. Alternatively, in some embodiments, the memory system 200 includes an SSD coupled to an HMB 228, which does not include DRAM.

Figure 3:
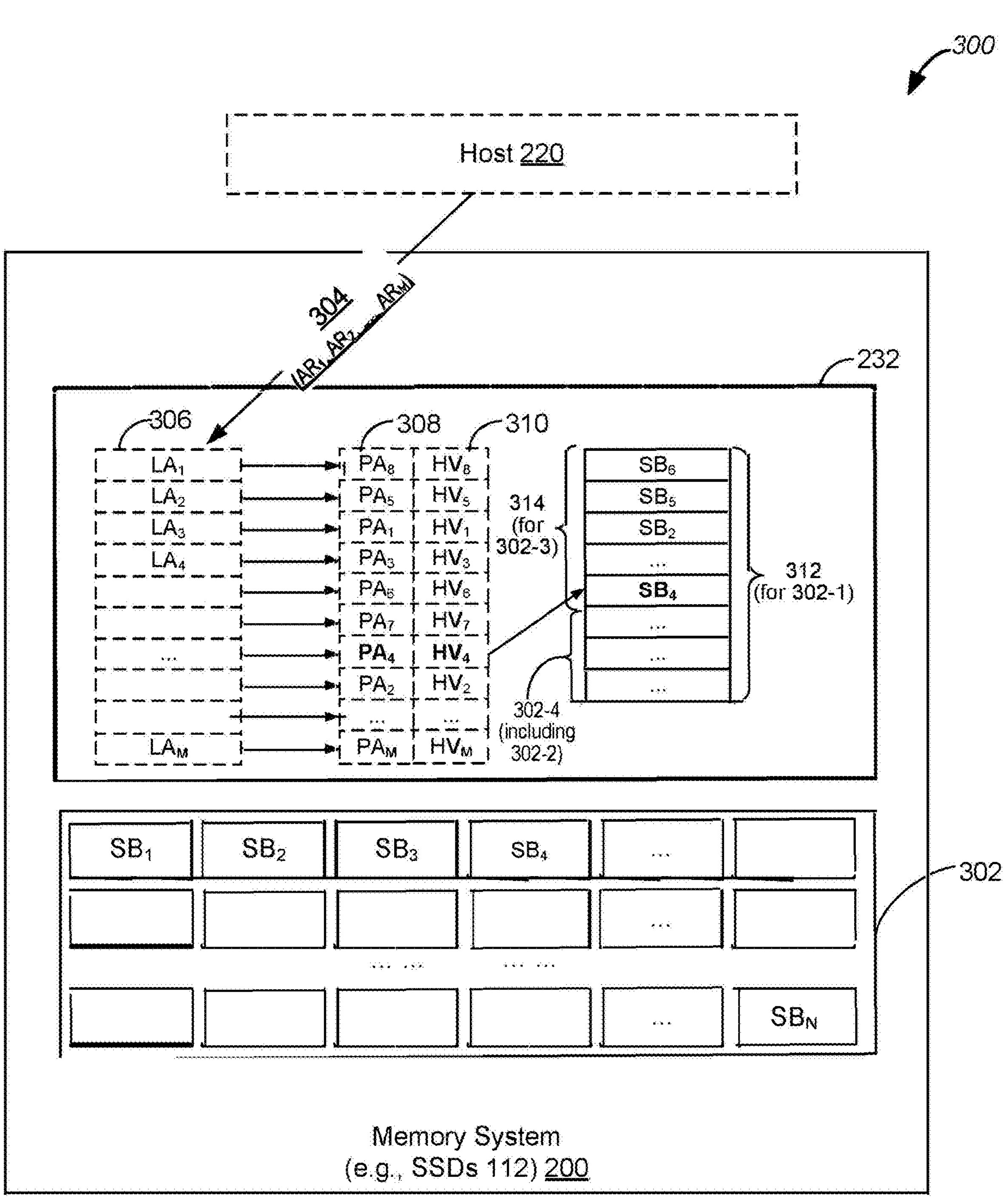
FIG. 3 illustrates an example process of accessing a superblock of a memory system in response to a hint received from a host, in accordance with some embodiments.

FIG. 3 illustrates an example process 300 of accessing a superblock 302 of a memory system 200 in response to a hint received from a host device 220, in accordance with some embodiments. The host device 220 is coupled to the memory system 200 including a plurality of superblocks 302. Each superblock 302 has a plurality of memory blocks, and the memory blocks of each superblock 302 are configured to be written into and read from the memory system via a memory I/O interface concurrently. The host device 220 is configured to send hints to the memory system 200 to access different superblocks 302. Each hint corresponds to a memory access request 304 including identification information (e.g., logical addresses) of respective one or more superblocks 302 to be accessed via the memory access request. In some embodiments, the hints correspond to a plurality of memory access requests 304 (e.g., $AR_1$, $AR_2$, . . . , ARM) including identification information 306 (e.g., $LA_1$, $LA_2$, . . . , LAM) of respective one or more superblocks 302 to be accessed. The memory system 200 includes a cache 232 that maps the identification information 306 (e.g., logical addresses) of the plurality of superblocks 302 to physical addresses 308 (e.g., $PA_1$, $PA_2$, . . . , PAM) of the plurality of superblocks 302 (e.g., $SB_1$-$SB_N$) in the memory system 200. Each of a first subset of superblocks 302-1 has a hint value 310 indicating an access level of the respective superblock 302-1. The first subset of superblocks 302-1 is ordered in the list 312 based on the hint values 310 of the respective superblocks 302-1, and the cache 232 further stores information of an ordered list 312 of superblocks.

In response to the plurality of access requests 304, the memory system 200 (e.g., the controller 2020) accumulates respective hint values 310 of the first subset of superblocks 302-1, and dynamically determines positions of the first subset of superblocks 302-1 in the ordered list 312 of superblocks based on the respective hint values 310 of the first subset of superblocks 302-1. In some situations, the ordered list 312 of superblocks is pruned to generate a pruned list 314 of superblocks, e.g., from a tail of the ordered list 312. Based on the pruned list 314 of superblocks, a second subset of superblocks 302-2 is selected from a set of remaining superblocks 302-4 in the ordered list 312, and converted from a first memory type (e.g., SCL) to a second memory type (e.g., QCL).

In some embodiments, the first memory type has a first memory access rate, and the second memory type has a second memory access rate that is slower than the first memory access rate. For example, the first memory type is a single level cell (SLC), and the second memory type is a quad-level cell (QLC), which has a higher storage density but a slower access rate than the SLC. In some embodiments, the memory system 200 (e.g., a new SSD) is substantially empty. A first portion of the memory system 200 (e.g., 200A in FIG. 8) is configured to the first memory type, while a second portion of the memory system 200 (e.g., 200B in FIG. 8) is distinct from the first portion and configured to the second memory type. Data is stored in the first portion if there is space left on the first portion, and continues to be stored in the second portion if the first portion is fully occupied. The ordered list 312 of superblocks is pruned to identify less frequently accessed or LRU superblocks, which are also called cold superblocks. A subset of the identified cold superblocks is converted from the first memory type to the second memory type. Stated another way, storage space of the first memory type is organized dynamically, adaptively, and in real time based on the plurality of access requests 304, and therefore, can be reserved to store most frequently or recently accessed superblocks (i.e., hot superblocks).

Figure 4A:
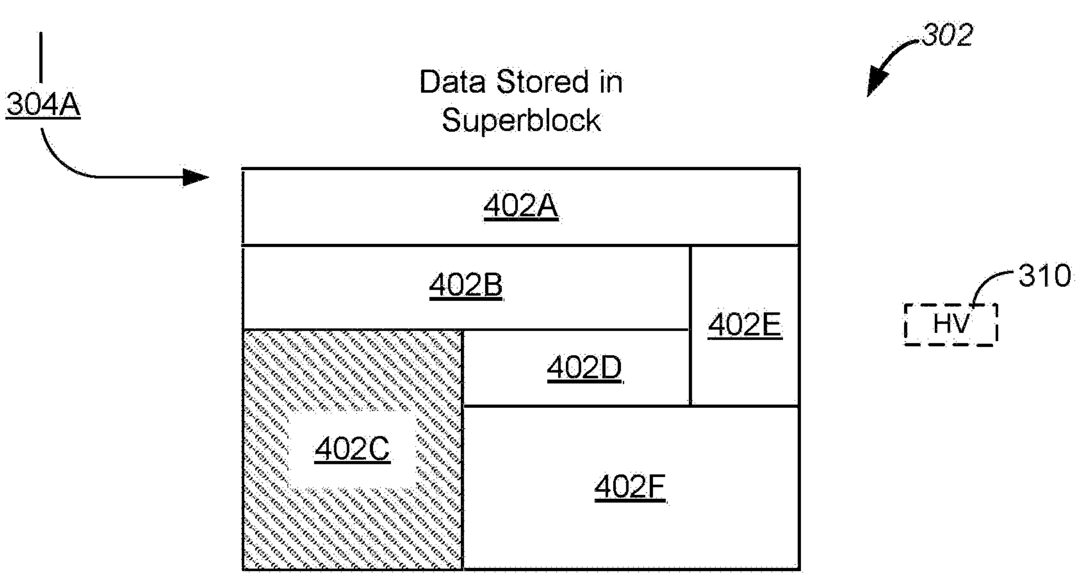
FIGS. 4A and 4B are structural diagrams of a superblock of a memory system associated with a threshold hint value, in accordance with some embodiments.
Figure 4B:
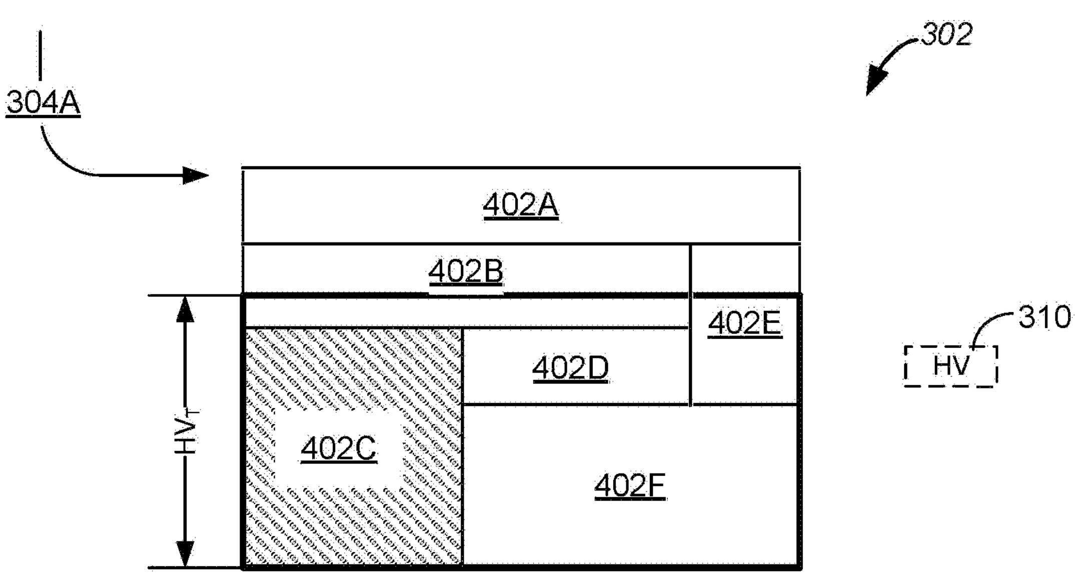

FIGS. 4A and 4B are structural diagrams of a superblock 302 of a memory system 200 associated with a threshold hint value $HV_T$, in accordance with some embodiments. The superblock 302 includes a plurality of memory cells that are configured to be written into and read from the memory system via a memory I/O interface concurrently, and the plurality of memory cells of the superblock 302 is distributed on a plurality of memory planes 208, a plurality of memory channels 204, and a plurality of memory packages 206 (e.g. memory chips). In some embodiments not shown, the superblock 302 stores only data corresponding to a program. In some embodiments, the superblock 302 is partitioned to a plurality of portions (e.g., 402A-402F), and each portion 402 is stored with data of a respective distinct program or empty to be stored with data. Each portion 402 has a respective portion size, and a sum of respective portion sizes of the portions is a superblock size of the superblock 302. Further, in some embodiments, data corresponding to a program is stored in two superblocks 302 each of which is entirely or partially filled with the data of the program.

The host device 220 sends a plurality of access requests 304 (FIG. 3) to the memory system 200, and the plurality of access requests 304 includes one or more access requests 304A to the superblock 302 including the portions 402A-402F. In response to each respective access request 304A, the memory system 200 accumulates a hint value 310 of the superblock 302. For example, the hint value 310 is initially equal to 0, and increases based on an access size of one or more portions 402 of the superblock 302 accessed by each respective access request 304A. In some embodiments, a scale factor (e.g., 1, 2, or 3) is equal to or greater than 1, and applied to determine the hint value 310 based on the access size. The access size of each respective access request 304A is scaled by the scale factor and added to the hint value 310. For example, the superblock size is 64 KB, and the portion 402C is 4 KB. An access request 304 for the portion 402C increases the hint value 310 by 12 KB if the scale factor is 3. As such, the hint value 310A is stored jointly with a physical address of the superblock 302 in the cache 232, and updated in response to each of the one or more access requests 304A.

In some embodiments, a threshold hint value $HV_T$ is defined for the superblock 302. For example, the threshold hint value $HV_T$ is based on the superblock size of the superblock 302, e.g., equal to 80%, 150%, or 300% of the superblock size. In accordance with a determination that the hint value 310 of the superblock 302 exceeds the threshold hint value, the memory system 200 classifies the respective superblock as a hot superblock and sets a position of the superblock 302 to a head of the ordered list 312 of superblocks. In some embodiments, before the hint value 310 reaches the threshold hint value $HV_T$, the superblock 302 is not added into the ordered list 312. Alternatively, in some embodiments, before the hint value 310 reaches the threshold hint value $HV_T$, the superblock 302 is ranked within the ordered list 312 based on the hint value 310. In an example, the one or more access requests 304A are all directed to a single portion 402C, and the hint value 310 accumulatively reaches the threshold hint value $HV_T$. In another example, the one or more access requests 304 are directed to two or more distinct portions, and the hint value 310 accumulatively reaches the threshold hint value $HV_T$. In some situations, when the one or more access requests 304A are directed to a portion 402E having a relatively small portion size, a larger number of access requests 304A is needed to increase the hint value 310 to the threshold hint value $HV_T$, compared with when the one or more access requests 304A are directed to a portion (e.g., 402C or 402F) having a relatively large portion size.

In some embodiments, the superblock 302 has not been entirely filled, e.g., when the portion 402F is empty and does not store any data yet. As data is written into each of the portions 402A-402E, the superblock 302 is stored in the cache 232, and the hint value 310 is gradually increased based on a size of the respective portion of the superblock that is optionally scaled by the scale factor. When the last portion (e.g., 402F) is written in response to a write request, the memory system 200 determines that the superblock 302 is closed after the write request, and writes the superblock 302 from the cache 232 to the corresponding physical addresses 308 of the memory system 200. In some situations, in accordance with a determination that the hint value 310 of the superblock 302 exceeds the threshold hint value $HV_T$ after this write request, the superblock 302 is set as the head of the ordered list 312 of superblocks. More details on closing an open superblock 302 are explained below with reference to FIG. 7.

Figure 5:
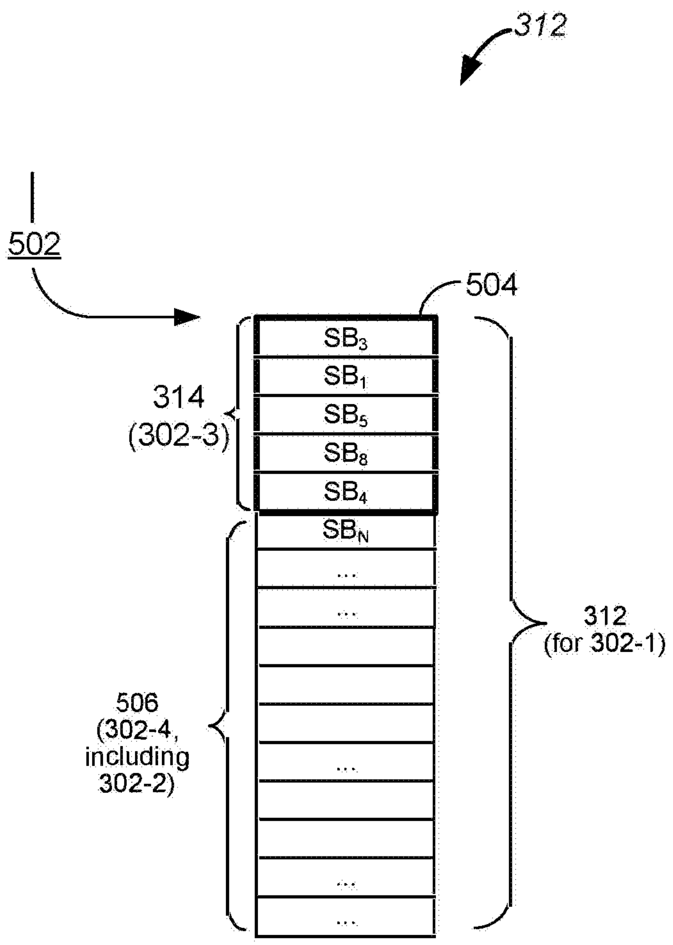
FIG. 5 is a structural diagram of an ordered list of superblocks of a memory system, in accordance with some embodiments.

FIG. 5 is a structural diagram of an ordered list 312 of superblocks of a memory system 200, in accordance with some embodiments. The ordered list 312 of superblocks includes a first subset of superblocks 302-1 of the memory system 200, and each of the first subset of superblocks 302-1 has a hint value 310 and is ordered dynamically in the list 312 based on the hint value 310. As a plurality of access requests 304 are received from the host device 220 and processed by the memory system 200, the hint values 310 of the first subset of superblocks 302-1 are accumulated and applied to dynamically determine positions of the first subset of superblocks 302-1 in the ordered list 312. The ordered list 312 is stored in the cache 232, and includes corresponding information (e.g., physical addresses) of the first subset of superblocks. The ordered list 312 does not include the superblocks 302 themselves. In some embodiments, the first subset of superblocks includes a set of first superblocks that is completed and stored in their corresponding physical addresses of the memory system 200. In some embodiments, the first subset of superblocks includes at least one second superblock that is not completed and temporarily stored in the cache 232.

The ordered list 312 of superblocks is pruned to generate a pruned list 314 of superblocks. In some embodiments, the ordered list 312 of superblocks is pruned in accordance with a determination that the memory system 200 satisfies a reorganization policy 502 (e.g., a portion of the memory system 200 having the first memory type is fully occupied or occupied by a predefined portion (e.g., 80%, 90%)). In some situations, the memory system 200 starts as substantially empty and a first portion of the memory system is configured to have a first memory type (e.g., an SLC memory type) and a remaining portion of the memory system is configured to have a second memory type (e.g., a QLC memory type). Superblocks 302 of the first portion of the memory system 200 are filled, before data is stored into superblocks 302 of the remaining portion of the memory system 200. In an example, when the superblocks 302 of the first portion of the memory system 200 are fully occupied, the reorganization policy 502 is satisfied, and a subset of the superblocks needs to be pruned from the ordered list 312 of superblocks and converted to the second memory type. In another example, when the superblocks 302 of the first portion of the memory system having the first memory type are occupied by the predefined portion (e.g., 80%, 90%), the reorganization policy 502 is satisfied, and a subset of the superblocks needs to be pruned from the ordered list of superblocks and converted to the second memory type.

The pruned list 314 of superblocks includes a third subset of superblocks 302-3, and the ordered list 312 of superblocks is pruned such that a total size of the third subset of superblocks in the pruned list 314 is equal to or less than a predefined hot superblock size 504 (maxLRUSize). An example size of the predefined hot superblock size 504 is 20 GB. The pruned list 314 is shorter than the ordered list 312 and stored in the cache 232. The pruned list 314 includes information (e.g., physical addresses) of the third subset of superblocks 302-3, and does not include the third subset of superblocks 302-3 themselves. In some embodiments, the third subset of superblocks 302-3 includes a set of first superblocks that is completed and stored in their corresponding physical addresses of the memory system 200. In some embodiments, the third subset of superblocks 302-3 includes at least one second superblock that is not completed and temporarily stored in the cache 232.

In some embodiments, one or more superblocks are removed from a tail of the ordered list 312 of superblocks, until superblocks of the pruned list 314 of superblocks satisfy a predefined list requirement. For example, in accordance with the predefined list requirement, a total memory size of the superblocks 302-3 in the pruned list 314 of superblocks does not exceed the predefined hot superblock size 504 (maxLRUSize). Referring to FIG. 5, the ordered list 312 of superblocks includes superblocks $SB_3$, $SB_1$, $SB_5$, $SB_8$, $SB_4$, $SB_N$, and other superblocks, and is pruned to remove the superblock $SB_N$ and the other superblocks following the superblock $SB_N$ in the ordered list 312. The pruned list 314 of superblocks includes superblocks $SB_3$, $SB_1$, $SB_5$, $SB_8$, $SB_4$, and the total size of superblocks $SB_3$, $SB_1$, $SB_5$, $SB_8$, $SB_4$ is less than or equal to the predefined hot superblock size 504 (maxLRUSize), e.g., 20 GB.

Stated another way, the predefined hot superblock size 504 (maxLRUSize) identify a total size of hot superblocks that is frequently or most recently accessed by the host device 220. The pruned list 314 includes these hot superblocks, while remaining superblocks 302-4 in the ordered list 312 are a list 506 of cold superblocks that are less frequently or least recently used as the pruned list 314 of hot superblocks. The remaining superblocks 302-4 are not selected or kept in the pruned list 314 corresponding to hot superblocks. Additionally, in some embodiments, these remaining superblocks 302-4 pruned from the ordered list 312 have the first memory type (e.g., SLC), which has a faster access rate than the second memory type and a limited size. The remaining superblocks 302-4 are converted to the second memory type (e.g., QLC), such that the first memory type is partially cleared to store upcoming data and allows the upcoming data to benefit from the faster access rate of the first memory type. It is noted that in some embodiments, the first memory type is not limited to SLC, and is optionally one of SLC, MLC, TLC, QLC, or the like, while the second memory type is slower than the first memory type.

Figure 6A:
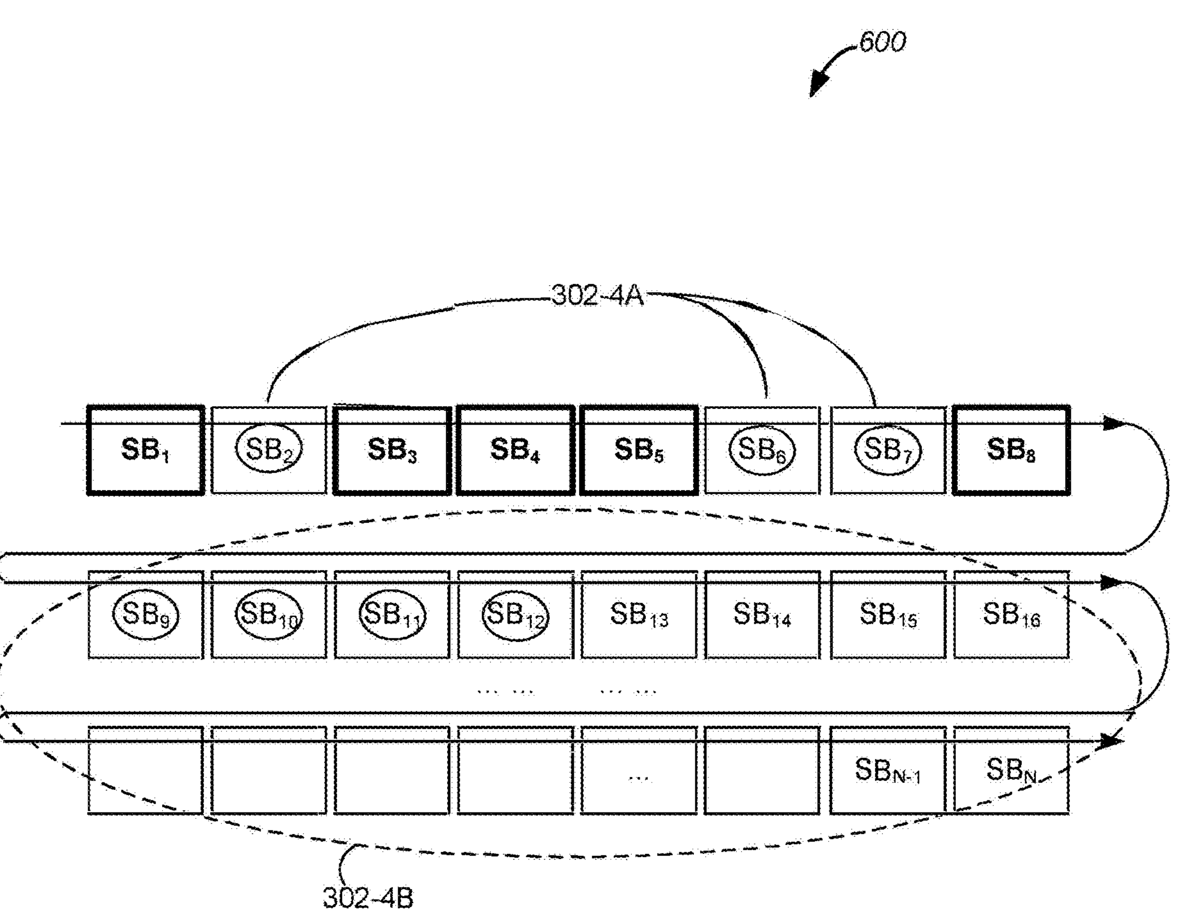
FIGS. 6A-6C illustrate three example orders of pruning an ordered list of superblocks of a memory system, in accordance with some embodiments.
Figure 6B:
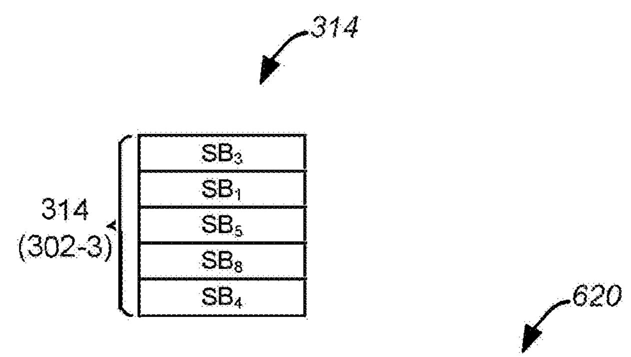
Figure 6B:
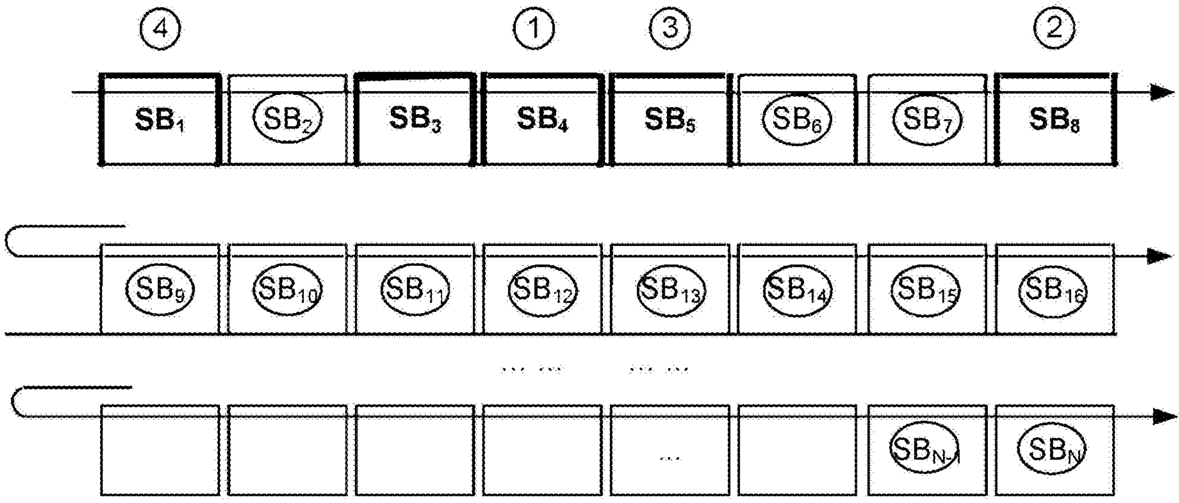
Figure 6C:
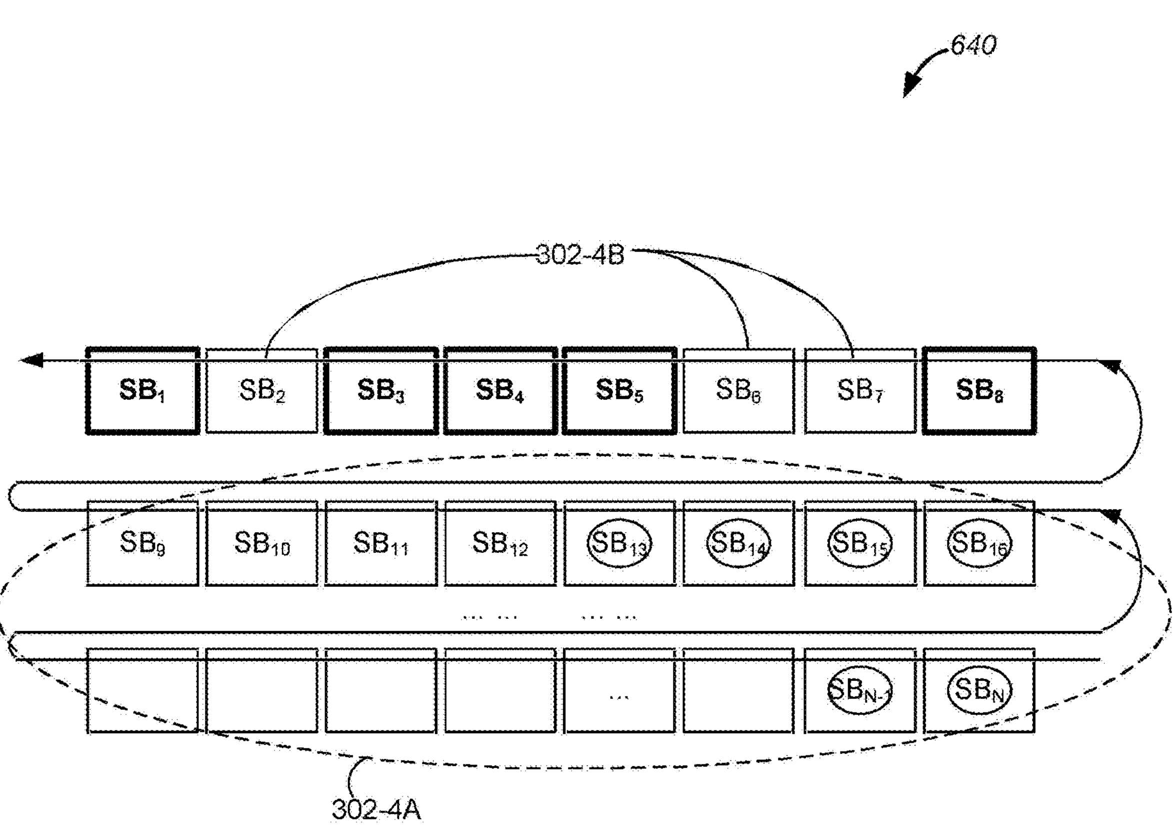

FIGS. 6A-6C illustrate three example orders 600, 620, and 640 of pruning an ordered list 312 of superblocks of a memory system 200, in accordance with some embodiments, respectively. The memory system 200 includes a series of superblocks $SB_1$, $SB_2$, $SB_3$, . . . . $SB_{N-1}$, and $SB_N$. The pruned list 314 of superblocks includes a third subset of superblocks $SB_3$, $SB_1$, $SB_5$, $SB_8$, and $SB_4$ (302-3). Based on the pruned list 314, a second subset of superblocks 302-2 is converted from a first memory type (e.g., SLC) to a second memory type (e.g., QLC). In some embodiments, the second subset of superblocks 302-2 is selected at least partially from a set of remaining superblocks 302-4 (FIG. 5) that are not included in the pruned list of superblocks 302-3.

Referring to FIG. 6A, in some embodiments, the series of superblocks $SB_1$, $SB_2$, $SB_3$, . . . . $SB_{N-1}$, and $SB_N$ is successively written into the memory system from a first superblock $SB_1$ to an N-th superblock $SB_N$. Based on the pruned list 314 of superblocks, the set of remaining superblocks 302-4 includes $SB_2$, $Sb_6$, $SB_7$, $SB_9$-$SB_N$, and the second subset of superblocks 302-2 is partially or entirely selected from the set of remaining superblocks 302-4 ($SB_2$, $Sb_6$, $SB_7$, $SB_9$-$SB_N$). Additionally, the second subset of superblocks 302-2 are successively selected from the set of remaining superblocks 302-4 based on respective data creation times of the set of remaining superblocks 302-4, e.g., in accordance with a first-in-first-out scheme. For example, remaining superblocks $SB_2$, $Sb_6$, $SB_7$, and $SB_9$-$SB_N$ are ordered according to their data creation times, and therefore, successively selected to be converted to the second memory type based on the first-in-first-out scheme. Specifically, in some embodiments, the set of remaining superblocks 302-4 includes a first subset of remaining superblocks 302-4A (e.g., $SB_2$, $SB_6$, $Sb_7$) and a second subset of remaining superblocks 302-4A (e.g., $SB_9$-$SB_N$). Each of the first subset of remaining superblocks 302-4A (e.g., $SB_2$, $SB_6$, $Sb_7$) is written before the second subset of remaining superblocks 302-4B (e.g., $SB_9$-$SB_N$). The first subset of remaining superblocks 302-4A (e.g., $SB_2$, $SB_6$, $Sb_7$) is selected and converted, and the second subset of remaining superblocks 302-4B (e.g., $SB_9$-$SB_N$) is not selected or converted.

Referring to FIG. 6B, in some embodiments, after selecting the second subset of superblocks 302-2 partially from the set of remaining superblocks 302-4, the memory system 200 selects additional superblocks of the second subset of superblocks 302-2 from the pruned list 314 of superblocks from a tail of the pruned list of superblocks. For example, after all of the remaining superblocks $SB_2$, $Sb_6$, $SB_7$, and $SB_9$-$SB_N$ are selected for conversion, additional superblocks of the second subset of superblocks 302-2 are selected from the pruned list 324 of superblocks and according to a reverse order of superblocks $SB_4$, $SB_8$, $SB_5$, $SB_1$, and $SB_3$.

Referring to FIG. 6C, in some embodiments, the series of superblocks $SB_1$, $SB_2$, $SB_3$, . . . , $SB_{N-1}$, and $SB_N$ is successively written into the memory system in a reserve order, from an N-th superblock $SB_N$ to a first superblock $SB_1$. Based on the pruned list 314 of superblocks, the set of remaining superblocks 302-4 includes $SB_2$, $Sb_6$, $SB_7$, $SB_9$-$SB_N$, and the second subset of superblocks 302-2 is partially or entirely selected from the set of remaining superblocks 302-4 ($SB_2$, $Sb_6$, $SB_7$, $SB_9$-$SB_N$). Further, in some embodiments, in accordance with a first-in-first-out scheme, the second subset of superblocks 302-2 are successively selected from the set of remaining superblocks 302-4 based on respective data creation times of the set of remaining superblocks 302-4. For example, one or more remaining superblocks $SB_2$, $SB_6$, $SB_7$, and $SB_9$-$SB_N$ are ordered in the reverse order according to their data creation times, and therefore, superblocks $SB_N$, $SB_{N-1}$, . . . . $SB_9$, $SB_7$, $SB_6$, and $SB_2$ are successively selected to be converted to the second memory type. Specifically, in some embodiments, the set of remaining superblocks 302-4 includes a first subset of remaining superblocks 302-4A (e.g., $SB_N$, $SB_{N-1}$, . . . , $SB_9$) and a second subset of remaining superblocks 302-4A (e.g., $SB_7$, $SB_6$, $SB_2$). Each of the first subset of remaining superblocks 302-4A (e.g., $SB_N$, $SB_{N-1}$, . . . , $SB_9$) is written before the second subset of remaining superblocks 302-4B (e.g., $SB_7$, $SB_6$, $SB_2$). The first subset of remaining superblocks 302-4A (e.g., $SB_N$, $SB_{N-1}$, . . . , $SB_9$) is selected and converted, and the second subset of remaining superblocks 302-4B (e.g., $SB_7$, $SB_6$, $SB_2$) is not selected or converted.

Figure 7:
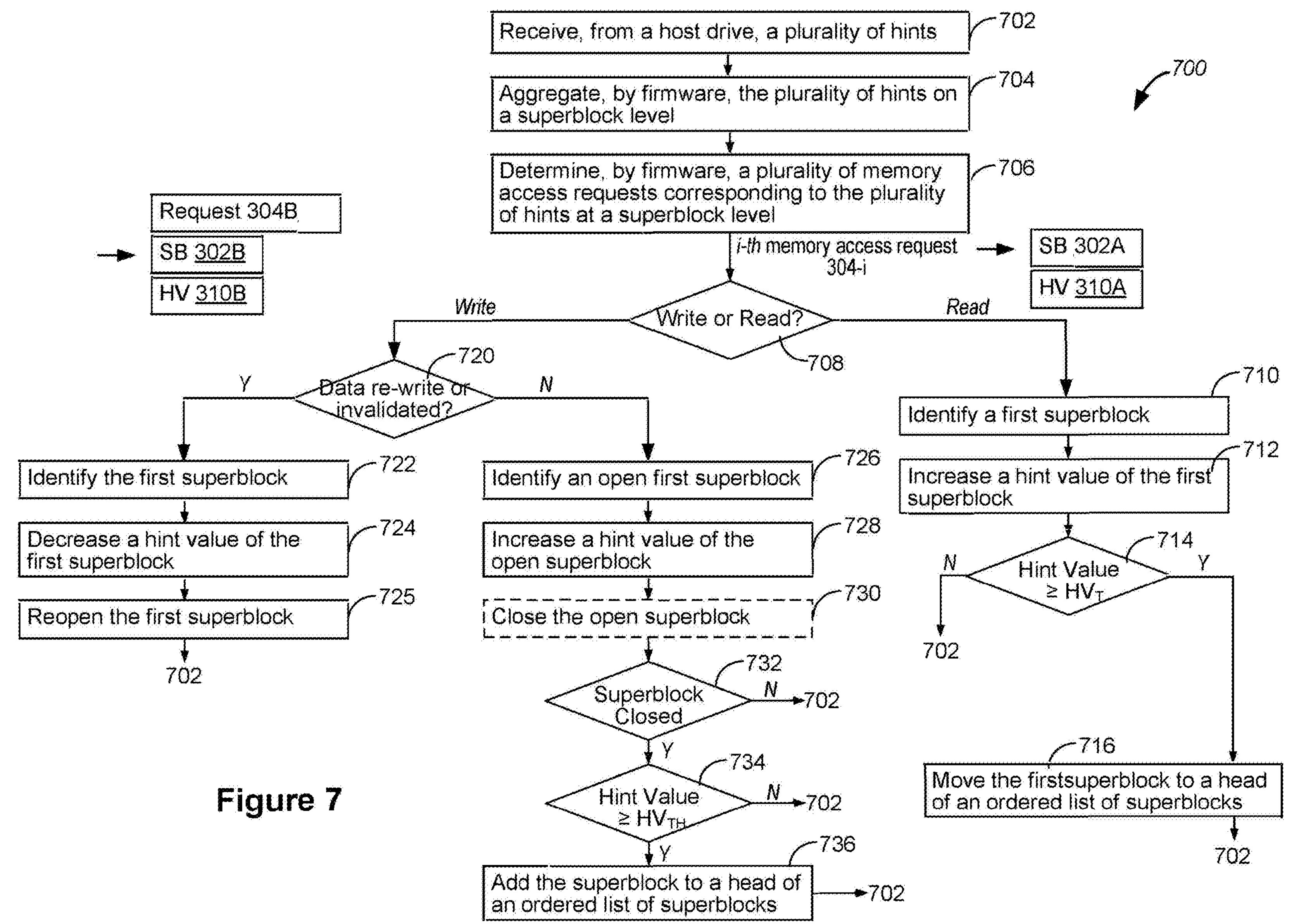
FIG. 7 is a flow diagram of an example process of managing an ordered list of superblocks of a memory system dynamically based on hints received from a host, in accordance with some embodiments.

FIG. 7 is a flow diagram of an example process 700 of managing an ordered list 312 of superblocks of a memory system 200 dynamically based on hints received from a host device 220, in accordance with some embodiments. The memory system 200 includes a plurality of superblocks 302 and a controller 202 coupled to the superblocks 302 and configured to read from, and write into, the superblocks 302. The memory system 200 is coupled to the host device 220 and receives (operation 702) a plurality of hints from a host drive of the host device 220. Firmware of the memory system 200 aggregates (operation 704) the plurality of hints on a superblock level. Each hint corresponds to a memory access request 304 including identification information (e.g., logical addresses) of respective one or more superblocks 302 to be accessed in response to the memory access request 304. The firmware of the memory system 200 determines (operation 706) a plurality of memory access requests 304 corresponding to the plurality of hints on the superblock level. The plurality of memory access requests 304 includes identification information 306 of respective one or more superblocks 302 to be accessed in response to each memory access request 304. The memory system 200 includes a cache 232 (e.g., a host managed cache (HMC)) for storing one or more of: an address mapping relationship, respective hint value HV of each of a first subset of superblocks 302-1, an ordered list 312 of superblocks, and a pruned list 314 of superblocks. The address mapping relationship associates identification information 306 (e.g., logical addresses) with physical addresses 308 of the respective one or more superblocks 302 to be accessed in response to each access request 304.

For each of the plurality of memory access requests 304-*i* received from the host device 220, the memory system 200 determines (operation 708) whether the respective access request 304-*i* includes a read request or a write request, e.g., associated with a first superblock 302A or a second superblock 302B. In some embodiments, in accordance with a determination that the respective access request 304-*i* includes a read request for a first superblock 302, the memory system 200 identifies (operation 710) the first superblock 302A and accumulatively increases (operation 712) a first hint value 310A of the first superblock 302A. The first hint value 310A is compared (operation 714) with a threshold hint value $HV_T$, e.g., to determine whether the first hint value 310A is greater than the threshold hint value $HT_T$, to determine whether the first hint value 310A is equal to or greater than the threshold hint value $HT_T$. In accordance with a determination that the first hint value 310A is equal to or greater than (i.e., ≥) the threshold hint value $HV_T$, the memory system 200 moves or adds (operation 716) the first superblock 302A to a head of the ordered list 312 of superblocks. Specifically, in some embodiments, information identifying the first superblock 302A is associated with a head position of the ordered list 312 of superblocks in the cache 232, while data written in the first superblock 302A is stored in the corresponding physical address 308 of the memory system 200. Conversely, in accordance with a determination that the first hint value 310A is less than the threshold hint value $HV_T$, the memory system 200 optionally does not add the superblock 302 into the ordered list 312 at all or determines a position of the first superblock 302A in the ordered list 312 based on the hint value (e.g., by arranging the first superblock 302A with remaining superblocks of the first subset of superblocks 302-1 in an decreasing order of their hint values).

In some embodiments, in accordance with a determination that the respective access request 304-*i* includes a write request for a first superblock 302A, the memory system 200 further determines (operation 720) whether the write request is to re-write or invalidate the first superblock 302A. In accordance with a determination that the write request is to re-write or invalidate the first superblock 302A, the memory system 200 identifies (operation 722) the first superblock 302A and decreases (operation 724) a first hint value 310A of the first superblock 302A. The first superblock 302A is reopened (operation 725). Conversely, in accordance with a determination that the write request is not to re-write or invalidate the first superblock 302A, the write request is to write into the first superblock 302A (which is an open superblock). The memory system 200 identifies (operation 726) the open first superblock 302A and increases (operation 728) the first hint value 310A of the open first superblock 302A. Further, in some situations, in accordance with a determination that the open first superblock 302 is filled and can be closed, the memory system 200 closes (operation 730) the open first superblock 302A. In accordance with a determination that the first superblock 302A is closed (operation 732), the memory system 200 compares (operation 734) the first hint value 310A of the first superblock 302A with a threshold hint value $HV_T$, e.g., to determine whether the first hint value 310A is greater than (>) the threshold hint value $HV_T$, to determine whether the first hint value 310A is equal to or greater than (≥) the threshold hint value $HV_T$.

In accordance with a determination that the first hint value 310A is equal to or greater than the threshold hint value $HV_T$, the memory system 200 adds (operation 736) the first superblock 302A to the head of the ordered list 312 of superblocks. Information identifying the superblock 302 is associated with the head position of the ordered list 312 of superblocks in the cache 232, while data written in the superblock 302 is stored in the corresponding physical addresses 308 of the memory system 200. Conversely, in accordance with a determination that the first hint value 310A is less than the threshold hint value $HV_T$, the memory system 200 does not add the superblock 302 into the ordered list 312 at all or determines a position of the first superblock 302A in the ordered list 312 based on the hint value (e.g., by arranging the first superblock 302A with remaining superblocks of the first subset of superblocks 302-1 in an decreasing order of their hint values).

In some embodiments, in response to a second memory access request 304B to access a portion of a second superblock 302B, the memory system 200 increases a second hint value 310B of the second superblock 302B based on a size of the portion of the second superblock 302B. In some situations, in accordance with a determination that the second memory access request 304B is a read request and that the second hint value of the second superblock exceeds a threshold hint value $HV_T$, the memory system 200 moves the second superblock 302B to a head of the ordered list 312 of superblocks. Alternatively, in some situations, in response to the second memory access request 304B, in accordance with a determination that (1) the second memory access request 304B is a write request, (2) the second superblock 302B is closed after the write request, and (3) the second hint value 310B of the second superblock 302B exceeds a threshold hint value $HV_T$, the memory system 200 adds the second superblock 302B to a head of the ordered list 312 of superblocks.

Figure 8:
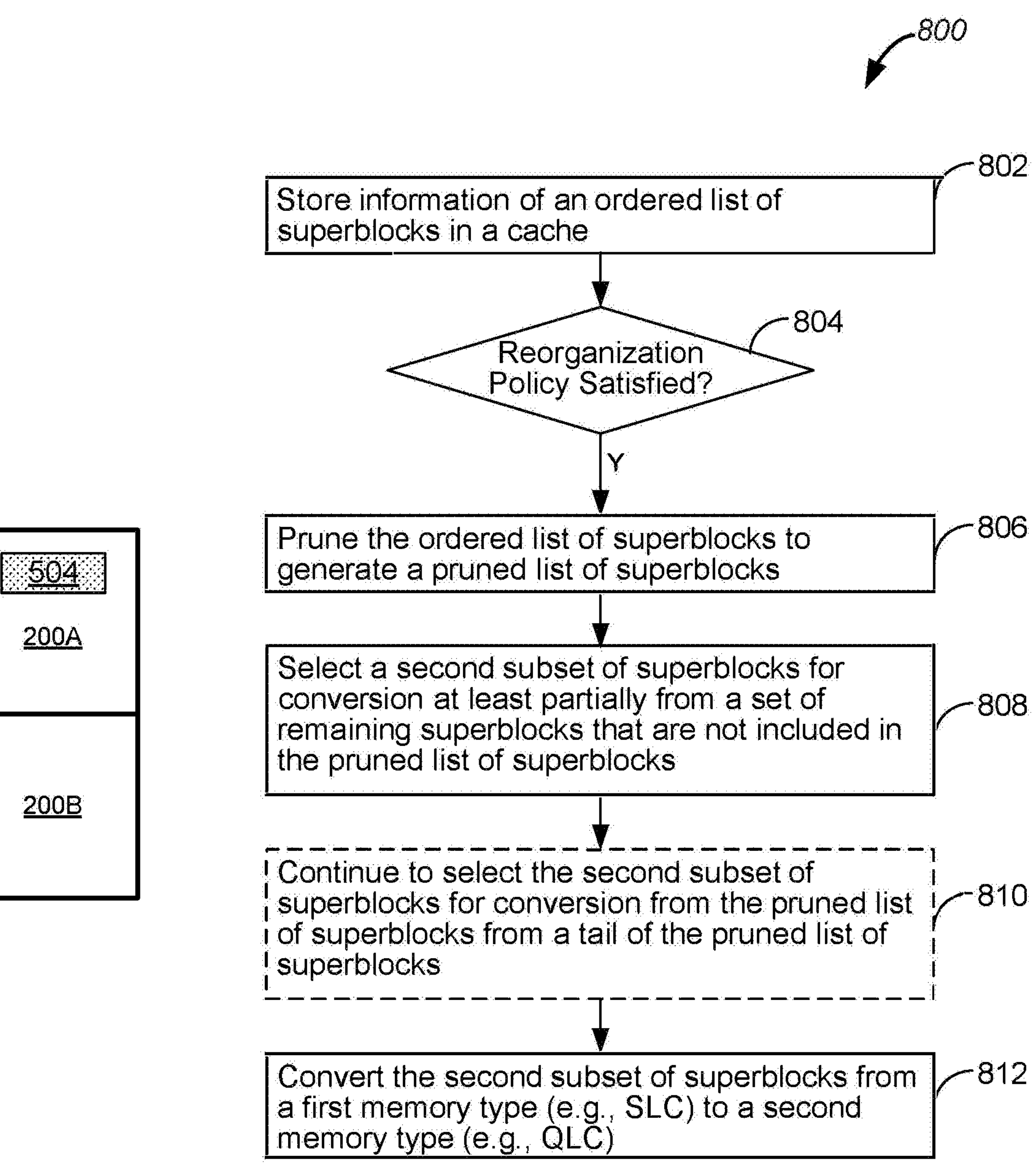
FIG. 8 is a flow diagram of an example process of managing memory types of superblocks of a memory system based on an ordered list of superblocks, in accordance with some embodiments.

FIG. 8 is a flow diagram of an example process 800 of managing memory types of superblocks 302 of a memory system 200 based on an ordered list 312 of superblocks, in accordance with some embodiments. The memory system 200 includes a plurality of superblocks 302. Each superblock includes a plurality of memory pages 210 distributed over a plurality of memory planes 208, a plurality of memory channels 204 and a plurality of memory chips. For each superblock, the plurality of memory pages 210 is configured to be written into and read from the memory system 200 via a memory I/O interface concurrently. In some embodiments, the memory system 200 is configured such that a first portion 200A has a first memory type (e.g., SLC) and a second portion 200B has a second memory type (e.g., MLC, TLC, QLC). The first memory type has a first access rate that is faster than a second access rate. In some situations, both the first portion 200A and the second portion 200B of the memory system 200 have unfilled memory cells, and data is written to the first portion 200A with a priority over the second portion 200B. The first portion 200A of the memory system 200 is configured with a predefined first memory size. When the first portion 200A is filled, data starts to be written into the second portion 200B. In some embodiments, the first portion 200A is further associated with a predefined hot superblock size 504 (MaxLRUSize), which is smaller than the predefined first memory size. An example size of the predefined hot superblock size 504 is 20 GB.

A first subset of superblocks 302-1 (e.g. having the first memory type) is ordered to form an ordered list 312 of superblocks based on the corresponding hint values 310 in response to a plurality of access requests 304. Information of the ordered list 312 is stored (operation 802) in the ordered list 312 of superblocks in a cache 232 (FIG. 2). The memory system 200 determines (operation 804) whether a reorganization policy 502 is satisfied. In some situations, the reorganization policy 502 is satisfied in accordance with a determination that the first portion 202A having the first memory type is fully occupied or occupied by a predefined portion (e.g., 80%, 90%). In accordance with a determination that the reorganization policy 502 is satisfied, the memory system 200 prunes (operation 806) the ordered list 312 of superblock to generate a pruned list 314 of superblocks. Superblocks in the pruned list 314 of superblocks optionally have a total size equal to or less than the predefined hot superblock size 504 (MaxLRUSize). Further, based on the pruned list 314 of superblocks, the memory system 200 selects (operation 808) a second subset of superblocks 302-2 at least partially from a set of remaining superblocks 302-4 that is not included in the pruned list 314 of superblocks. In some embodiments (FIG. 6B), the memory system 200 continues (operation 810) to select the second subset of superblocks 302-2 from the pruned list 314 of superblocks from a tail of the pruned list 314 of superblocks. The second subset of superblocks 302-2 is converted (operation 812) from the first memory type to the second memory type. By these means, a set of cold superblocks external to the pruned list 314 of superblocks are converted from the first memory type to the second memory size to clear some allocated space of the first memory type to store new data, particularly when the first portion 200A of the memory system 200 allocated to the first memory type has been fully occupied.

FIG. 9 is a flow diagram of another example memory management method 900 implemented by an electronic device, in accordance with some embodiments. A memory system 200 includes a plurality of superblocks 302. The memory system 200 receives (operation 902) a plurality of access requests to access the plurality of superblocks 302, e.g., from a host drive of a host device 220. The memory system 200 stores (operation 904) information of an ordered list 312 of superblocks in a cache 232 (e.g., a host managed cache). Each of a first subset of superblocks 302-1 has a hint value and is ordered based on the hint value. In response to the plurality of access requests (operation 906), the memory system 200 accumulates (operation 908) respective hint values 310 of the first subset of superblocks 302-1 and dynamically determines (operation 910) positions of the first subset of superblocks 302-1 in the ordered list 312 of superblocks based on the respective hint values 310 of the first subset of superblocks 302-1. The ordered list 312 of superblocks is pruned to generate a pruned list 314 of superblocks. Based on the pruned list 314 of superblocks, the memory system 200 converts (operation 912) a second subset of superblocks 302-2 from a first memory type to a second memory type. In some embodiments, the first memory type has a first memory access rate, and the second memory type has a second memory access rate that is slower than the first memory access rate.

In some embodiments, the memory system 200 includes an SSD having a plurality of NAND flash chips, and each superblock 302 includes a plurality of memory blocks each of which further includes a plurality of memory pages. For each superblock, the plurality of memory blocks are configured to be written into and read from the memory system 200 via a memory input/output (I/O) interface concurrently. In some embodiments, each superblock 302 is a collection of memory cells that are distributed on a plurality of memory planes 208, a plurality of memory channels 204, and a plurality of memory chips. It is noted that in some embodiments, the "superblocks" are broadly regarded as memory units that are managed by the memory system 200 in response to memory access requests 304.

In some embodiments, positions of the first subset of superblocks 302-1 in the ordered list 312 of superblocks are dynamically determined by, dynamically and in response to each respective access request 304, in accordance with a determination that the hint value 310 of a respective superblock 302 exceeds a threshold hint value $HV_T$, classifying (operation 914) the respective superblock as a hot superblock and setting the position of the respective superblock to a head of the ordered list 312 of superblocks.

In some embodiments, the ordered list 312 of superblocks is pruned by removing (operation 918) one or more superblocks from a tail of the ordered list 312 of superblocks, until superblocks of the pruned list 314 of superblocks satisfy a predefined list requirement. Further, in some embodiments, in accordance with the predefined list requirement, a total memory size of the superblocks in the pruned list 314 of superblocks does not exceed (operation 920) a predefined hot superblock size (e.g., 20 GB).

In some embodiments, the memory system 200 determines (operation 916) whether the memory system 200 satisfies an reorganization policy 502. In accordance with a determination that the memory system 200 satisfies the reorganization policy 502, the memory system 200 prunes the ordered list 312 of superblocks and converts the second subset of superblocks 302-2. In some situations, the memory system 200 is substantially empty, and superblocks of a portion of the memory system 200 are configured to an SLC memory type, while remaining superblocks of the memory system 200 are configured to a distinct memory type (e.g., a QLC memory type). The superblocks of the portion of the memory system 200 are filled when data starts to be stored in the memory system 200. In an example, when the superblocks of the portion of the memory system 200 having the SLC memory type are fully occupied, the reorganization policy 502 is satisfied, and a subset of the superblocks needs to be pruned from the ordered list 312 of superblocks and converted to the distinct memory type. In another example, when the superblocks of the portion of the memory system 200 having the SLC memory type are occupied by a predefined portion (e.g., 80%, 90%), the reorganization policy 502 is satisfied, and a subset of the superblocks needs to be pruned from the ordered list 312 of superblocks and converted to the distinct memory type. As such, in some embodiments, the first memory type is (operation 922) a single level cell (SLC), and the second memory type is a quad-level cell (QLC). The second subset of superblocks 302-2 is pruned to become external to the pruned list 314 of superblocks, and therefore, is converted from the SLC based first memory type to the QLC based second memory type.

In some embodiments, the memory system 200 selects (operation 924) the second subset of superblocks 302-2 at least partially from a set of remaining superblocks 302-4 that are not included in the pruned list 314 of superblocks. Further, in some embodiments (FIG. 6B), after selecting the second subset of superblocks 302-2 partially from the set of remaining superblocks 302-4, the memory system 200 selects (operation 926) additional superblocks of the second subset of superblocks 302-2 from the pruned list 314 of superblocks from a tail of the pruned list 314 of superblocks. Additionally, in some embodiments (FIGS. 6A and 6C), in accordance with a first-in-first-out scheme, the second subset of superblocks 302-2 are successively selected (operation 928) from the set of remaining superblocks 302-4 based on respective data creation times of the set of remaining superblocks 302-4. Specifically, referring to FIG. 6A or 6C, the set of remaining superblocks 302-4 includes a first subset of remaining superblocks 302-4A and a second subset of remaining superblocks 302-4B. Each of the first subset of remaining superblocks 302-4A is written before the second subset of remaining superblocks 302-4B. The first subset of remaining superblocks 302-4A is selected and converted, and the second subset of remaining superblocks 302-4B is not selected or converted.

In some embodiments, the memory system 200 obtains a set of first hints from a host driver, and the set of first hints includes a set of first memory access requests (e.g., access request 302-*i*) for a first superblock 302A. The memory system 200 accumulates a first hint value 310A of the first superblock 302A in response to each respective first memory access request. Specifically, the first hint value 310A is decreased in accordance with a determination that the first superblock 302A is re-written or invalidated in response to the respective first memory access request, and increased in accordance with a determination that the respective first memory access request includes a read request. In accordance with a determination that the first superblock 302A is closed, the memory system 200 stores the first hint value 310A with the first superblock 302A in the memory system 200.

In some embodiments (FIG. 7), the memory system 200 accumulates respective hint values 310 of the first subset of superblocks 302-1 by in response to a second memory access request 304B to access a portion (e.g., any of portions 402A-402F in FIG. 4A) of a second superblock 302B, increasing a second hint value 310B of the second superblock 302B based on a size of the portion of the second superblock 302B. Further, in some embodiments, in response to the second memory access request 304B, the memory system 200 moves the second superblock 302B to a head of the ordered list 312 of superblocks in accordance with a determination that the second memory access request 304B is a read request and that the second hint value 310B of the second superblock 302B exceeds a threshold hint value $HV_T$ (e.g., in operations 710-716 in FIG. 7). Alternatively, in some embodiments, in response to the second memory access request 304B, the memory system 200 adds the second superblock 302B to a head of the ordered list 312 of superblocks, in accordance with a determination (e.g., in operations 708, 732, and 734) that (1) the second memory access request 304B is a write request, (2) the second superblock 302B is closed after the write request, and (3) the second hint value 310B of the second superblock 302B exceeds a threshold hint value $HV_T$.

It should be understood that the particular order in which the operations in FIGS. 7-9 have been described are merely exemplary and are not intended to indicate that the described order is the only order in which the operations could be performed. One of ordinary skill in the art would recognize various ways to manage data stored in a memory system 200 (e.g., an SSD 112). Additionally, it should be noted that details of other processes described above with respect to FIGS. 1-6C are also applicable in an analogous manner to methods 700, 800, and 900 described above with respect to FIGS. 7, 8, and 9. For brevity, these details are not repeated here.

Memory is also used to storing instructions and data associated with the methods 700, 800, and 900, and includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing methods 700, 800, and 900.

Host managed cache 232 relies on the hints sent by the host driver to select the coldest blocks for garbage collection. The Host software has a limited range of logical block addresses that are classified as "hot" or "important" (e.g., around 20 GB). Firmware aggregates the hints at superblock level and when a superblock is closed its associated hint is also stored in NAND. If there are more reads and they are deemed as hot data, the consolidated hint of a superblock can increase. However, the hint of a superblock can decrease only on partial host invalidation (host partially re-writing the contents or partially trim the data). Since there is no handshake for hint demotion (hot to cold) there is risk that data that was hot at some point of time could have been classified as cold by the host but it would continue to be treated as hot. This occupies critical SLC space and results in SLC starvation for newer data. Thus, there is a need to limit the max amount of hot data to stay in line with the host classification.

Since the host only has a finite amount of data that is classified as a hot, firmware shall follow the same and limit the amount of hot data. firmware defines a constant maxLRUSize (in 4K units) to control the max data LRU list. In some embodiments, a classifier is applied at the firmware end to track the data in SLC as two categories hot data and normal data. firmware shall employ a bare metal LRU algorithm to only retail the last 'maxLRUSize' of the host hot data.

Firmware aggregates the data hint from the host (on read and write) at a super block level and uses a threshold to classify the super block as block and cold block. QLC memory are configured to be SLC first, and all hot and cold data are located in SLC. The total amount of hot data in SLC can be greater than the maxLRUsize. The LRU size is pruned only when there is a need to move data from SLC to QLC (e.g., when a reorganization policy 502 is satisfied). All reads from the host will have a hit associated with it and the firmware add this hint to the super block (superblock) that the data maps to. If the hint of superblock Is greater than threshold it is moved to the head of LRU. All writes from the host will have a hit associated with it and the firmware always writes this to the open block and aggregates it. When the Block is closed if the hint of superblock is greater than threshold it is added to the head of LRU. When there is a need to move data from SLC to QLC the firmware LRU is pruned by removing superblock from the tail of LRU until the total data in LRU is less than the max LRU size. Once the LRU list is pruned source SLC blocks are picked in the FIFO order (outside LRU). When we encounter a block that is part of LRU that block is skipped. If the all the blocks outside of LRU have been moved to QLC and there are no more SLC blocks to move, source blocks are picked from the tail of LRU. When the total SLC space is less than maxLRUSize, HMC is disabled and LRU is cleared. All future GC are FIFO based until more SLC memory space is reclaimed.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Particularly, any examples involving specific numbers or configurations are not intended to be exhaustive or to limit the scope of the claims to the precise examples disclosed. Many modifications and variations are possible in view of the above teachings or common knowledge of one skilled in the art. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented at an electronic device, the method comprising:

receiving a plurality of access requests to a memory system including a plurality of superblocks, wherein each of a first subset of superblocks has a respective access level;

organizing the first subset of superblocks based on their respective access levels to form an ordered list of superblocks; and pruning the ordered list of superblocks to generate a pruned list of superblocks; and based on the pruned list of superblocks, converting a second subset of superblocks from a first memory type to a second memory type.

2. The method of claim 1, further comprising dynamically determining positions of the first subset of superblocks in the ordered list of superblocks based on the respective access level of the first subset of superblocks.

3. The method of claim 2, wherein each of the first subset of superblocks has a respective hint value indicating the respective access level, and dynamically determining positions of the first subset of superblocks further comprises:

in response to each respective access request, in accordance with a determination that the respective hint value of a respective superblock exceeds a threshold hint value, classifying the respective superblock as a hot superblock and setting a position of the respective superblock to a head of the ordered list of superblocks.

4. The method of claim 1, pruning the ordered list of superblocks further comprising:

removing one or more superblocks from a tail of the ordered list of superblocks, until superblocks of the pruned list of superblocks satisfy a predefined list requirement.

5. The method of claim 4, wherein in accordance with the predefined list requirement, a total memory size of the superblocks in the pruned list of superblocks does not exceed a predefined hot superblock size.

6. The method of claim 1, further comprising:

determining whether the memory system satisfies an reorganization policy, wherein in accordance with a determination that the memory system satisfies the reorganization policy, the ordered list of superblocks is pruned and the second subset of superblocks is converted.

7. The method of claim 1, wherein the first memory type has a first memory access rate, and the second memory type has a second memory access rate that is slower than the first memory access rate.

8. The method of claim 1, wherein the first memory type is a single level cell (SLC), and the second memory type is a quad-level cell (QLC).

9. The method of claim 1, further comprising:
selecting the second subset of superblocks at least partially from a set of remaining superblocks that are not included in the pruned list of superblocks.

10. The method of claim 9, further comprising:
after selecting the second subset of superblocks partially from the set of remaining superblocks, selecting additional superblocks of the second subset of superblocks from the pruned list of superblocks from a tail of the pruned list of superblocks.

11. The method of claim 9, wherein in accordance with a first-in-first-out scheme, the second subset of superblocks are successively selected from the set of remaining superblocks based on respective data creation times of the set of remaining superblocks.

12. The method of claim 9, wherein:
the set of remaining superblocks includes a first subset of remaining superblocks and a second subset of remaining superblocks;
each of the first subset of remaining superblocks is written before the second subset of remaining superblocks; and
the first subset of remaining superblocks is selected and converted, and the second subset of remaining superblocks is not selected or converted.

13. The method of claim 1, further comprising:
obtaining a set of first hints from a host driver, the set of first hints including a set of first memory access requests for a first superblock;
accumulating a first hint value of the first superblock in response to each respective first memory access request, including:
in accordance with a determination that the first superblock is re-written or invalidated in response to the respective first memory access request, decreasing the first hint value; and
in accordance with a determination that the respective first memory access request includes a read request, increasing the first hint value; and
in accordance with a determination that the first superblock is closed, storing the first hint value with the first superblock in the memory system, the first hint value indicating a first access level of the first superblock.

14. An electronic device, comprising:
one or more processors; and
a memory system including a plurality of superblocks and storing one or more programs configured for execution by the one or more processors, the one or more programs comprising instructions for:
receiving a plurality of access requests to a memory system including a plurality of superblocks, wherein each of a first subset of superblocks has a respective access level;
organizing the first subset of superblocks based on their respective access levels to form an ordered list of superblocks; and
pruning the ordered list of superblocks to generate a pruned list of superblocks; and
based on the pruned list of superblocks, converting a second subset of superblocks from a first memory type to a second memory type.

15. The electronic device of claim 14, the one or more programs further comprising instructions for, in response to the plurality of access requests, accumulating respective hint values of the first subset of superblocks, wherein for each of the first subset of superblocks, the respective hint value indicates the respective access level of the respective superblock.

16. The electronic device of claim 15, accumulating the respective hint values of the first subset of superblocks further comprising in response to a second memory access request to access a portion of a second superblock, increasing a second hint value of the second superblock based on a size of the portion of the second superblock.

17. The electronic device of claim 16, accumulating the respective hint values of the first subset of superblocks further comprising, in response to the second memory access request, in accordance with a determination that the second memory access request is a read request and that the second hint value of the second superblock exceeds a threshold hint value, moving the second superblock to a head of the ordered list of superblocks.

18. The electronic device of claim 16, accumulating respective hint values of the first subset of superblocks further comprising, in response to the second memory access request, in accordance with a determination that (1) the second memory access request is a write request, (2) the second superblock is closed after the write request, and (3) the second hint value of the second superblock exceeds a threshold hint value, adding the second superblock to a head of the ordered list of superblocks.

19. A non-transitory computer-readable storage medium storing one or more programs to be executed by one or more processors for managing data in a memory system including a plurality of superblocks, the one or more programs comprising instructions for:
receiving a plurality of access requests to a memory system including a plurality of superblocks, wherein each of a first subset of superblocks has a respective access level;
organizing the first subset of superblocks based on their respective access levels to form an ordered list of superblocks; and
pruning the ordered list of superblocks to generate a pruned list of superblocks; and
based on the pruned list of superblocks, converting a second subset of superblocks from a first memory type to a second memory type.

20. The non-transitory computer-readable storage medium of claim 19, wherein:
the memory system includes a SSD having a plurality of NAND flash chips;
each superblock includes a plurality of memory blocks each of which further includes a plurality of memory pages; and
for each superblock, the plurality of memory blocks are configured to be written into and read from the memory system via a memory input/output interface concurrently.

* * * * *